(12) United States Patent
Gökçe et al.

(10) Patent No.: US 12,518,461 B1
(45) Date of Patent: Jan. 6, 2026

(54) REAL-TIME ADAPTABLE INTERACTIVE AI PERSONA

(71) Applicants: Sinan Gökçe, Geneva (CH); Hussein Ghazy, St Cergue (CH)

(72) Inventors: Sinan Gökçe, Geneva (CH); Hussein Ghazy, St Cergue (CH)

( * ) Notice: Subject to any disclaimer, the term of this patent is extended or adjusted under 35 U.S.C. 154(b) by 0 days.

(21) Appl. No.: 19/096,255

(22) Filed: Mar. 31, 2025

Related U.S. Application Data (60) Provisional application No. 63/779,985, filed on Mar. 28, 2025.

(51) Int. Cl.
| | |
|---|---|
| *G06T 13/80* | (2011.01) |
| *G06F 3/01* | (2006.01) |
| *G06N 3/008* | (2023.01) |
| *G06T 7/20* | (2017.01) |
| *G06T 13/40* | (2011.01) |
| *G06V 40/16* | (2022.01) |
| *G10L 15/26* | (2006.01) |

(52) U.S. Cl.
CPC .............. *G06T 13/80* (2013.01); *G06F 3/013* (2013.01); *G06T 7/20* (2013.01); *G06V 40/176* (2022.01); *G10L 15/26* (2013.01)

(58) Field of Classification Search
CPC ......... G06N 3/008; G06T 13/40; G06T 13/80; G06V 40/176
See application file for complete search history.

(56) References Cited

U.S. PATENT DOCUMENTS

| | | | |
|---|---|---|---|
| 9,507,860 B1* | 11/2016 | Oztaskent | G06F 16/63 |
| 2003/0130954 A1* | 7/2003 | Carr | G06Q 30/02 705/60 |
| 2009/0299932 A1* | 12/2009 | Hodge | G06N 5/02 706/45 |
| 2019/0095775 A1* | 3/2019 | Lembersky | G06N 3/006 |
| 2021/0048975 A1* | 2/2021 | Panwar | G06V 10/82 |
| 2022/0241985 A1* | 8/2022 | Scherer | B25J 11/0015 |
| 2024/0127000 A1* | 4/2024 | Yin | G06N 3/08 |

\* cited by examiner

*Primary Examiner* — Yi Yang
(74) *Attorney, Agent, or Firm* — Innovent Law P.C.; Karima Gulick (57) ABSTRACT

A method, including converting an audio input to a text input, generating, by an artificial intelligence (AI) persona, at least one of a visual output and an audio output based on the text input and a face input, synchronizing, by the AI persona, at least one of the visual output and the audio output to movement of a rendered facial image, and modifying, by the AI persona, at least one of the visual output and the audio output in real-time in response to real-time changes in the audio input and the face input.

20 Claims, 8 Drawing Sheets

REAL-TIME ADAPTABLE INTERACTIVE AI PERSONA

CROSS-REFERENCE TO RELATED APPLICATION

This application incorporates by reference and claims the benefit of priority to U.S. Provisional Application 63/779,985 filed on Mar. 28, 2025.

BACKGROUND OF THE INVENTION

1. Field of the Invention

This invention relates to an interactive artificial intelligence system. More particularly, the invention relates to a real-time adaptable interactive AI system that engages in active and reactive discussion with a user.

2. Description of the Related Art

Artificial intelligence (AI) conversational agents have evolved significantly over the last decade, yet existing AI systems remain limited in their ability to provide real-time, human-like interactions. Current AI-powered assistants primarily rely on text-based or audio-only exchanges, which lack the multimodal depth necessary for natural engagement. Most AI-driven solutions, such as virtual assistants, chatbots, and customer service applications, fail to synchronize multiple sensory inputs including speech, text, facial expressions, and gaze tracking resulting in rigid, disconnected, and unnatural conversations.

One of the key challenges in AI-human interaction is latency, which refers to the delay between user input and AI response generation. Most AI assistants experience significant delays in generating responses, disrupting the flow of conversation. This latency issue arises due to inefficient natural language processing (NLP) models, lack of predictive response caching, and high computational loads in real-time AI inference. As a result, users often experience unnatural pauses in conversations, leading to reduced engagement and frustration.

Another limitation of conventional AI systems is their inability to recognize and adapt to human emotions in real-time. Current AI assistants operate on rule-based responses or predefined sentiment analysis models that do not dynamically adjust their speech tone, facial expressions, or gestures based on the user's emotional state. Additionally, micro-expression detection and gaze tracking which are essential components of natural human interaction are absent in most AI-driven persona models. This deficiency makes existing AI assistants incapable of expressing empathy, recognizing user stress levels, or modifying interaction intensity dynamically.

Furthermore, existing AI systems lack real-time multimodal, contextual awareness and long-term memory, making interactions feel repetitive, disjointed, and unnatural user interaction. Users are required to repeat contextual details across multiple interactions because the AI system does not retain past engagement data. Without predictive learning capabilities, AI assistants fail to personalize conversations over time, limiting their usefulness in therapy, education, professional mentorship, and long-term engagement scenarios.

Currently, there are no useful alternatives that effectively assist a user in real-time, latency-optimized, context-and-emotion-aware, and adaptive AI-human interactions.

Accordingly, there is a need for a method and system to overcome the disadvantages of current AI systems.

SUMMARY OF THE INVENTION

The present disclosure provides a real-time adaptable interactive AI persona.

The foregoing and/or other features and utilities of the present disclosure may be achieved by providing a method, including converting an audio input to a text input, generating, by an artificial intelligence (AI) persona, at least one of a visual output and an audio output based on the text input and a face input, synchronizing, by the AI persona, at least one of the visual output and the audio output to movement of a rendered facial image, and modifying, by the AI persona, at least one of the visual output and the audio output in real-time in response to real-time changes in the audio input and the face input.

The generating at least one of a visual output and an audio output includes generating at least one of the visual output and the audio output based on a predicted response cached by the AI persona.

The predicted response of the AI persona uses at least one context-aware vector representation of at least one predicted query.

The method further includes generating a plurality of responses corresponding to the at least one predicted query, wherein each of the plurality of responses is unique and modifies at least one of the visual output and the audio output, and modifying each of the plurality of responses based on the text input and the face input, and adjusting engagement style based on recurring sentiment trends and detected behavioral patterns.

The modifying at least one of the visual output and audio output includes modifying at least one of the visual output and audio output based on a plurality of multimodal inputs and reinforcement learning-based adaptation for AI persona refinement over time.

Each of the plurality of multimodal inputs is at least one of voice tone, facial expression, and content of the text input, and the AI persona continuously updates its response model using reinforcement learning and past user interactions.

The face input is at least one of a facial expression, a gaze, and facial micro-expressions for stress detection and engagement tracking.

The audio input is at least one of tone, pitch, and speed.

The foregoing and/or other features and utilities of the present disclosure may also be achieved by providing an artificial intelligence (AI) persona system, including one or more processing units, the one or processing units configured to: convert an audio input to a text input, generate at least one of a visual output and an audio output based on the text input and a face input, synchronize at least one of the visual output and the audio output to movement of a rendered facial image, and modify at least one of the visual output and the audio output in real-time in response to real-time changes in the audio input and the face input.

The one or more processing units are configured to generate at least one of the visual output and the audio output based on a predicted response that is cached.

The one or more processing units are configured to determine the predicted response using at least one context-aware vector representation of at least one predicted query.

The one or more processing units are further configured to: generate a plurality of responses corresponding to the at least one predicted query, wherein each of the plurality of responses is unique and modifies at least one of the visual output and the audio output, and modify each of the plurality of responses based on the text input and the face input and adjust engagement style based on recurring sentiment trends and detected behavioral patterns.

The one or more processing units are configured to modify at least one of the visual output and audio output based on a plurality of multimodal inputs and reinforcement learning-based adaptation for AI persona refinement over time.

Each of the plurality of multimodal inputs is at least one of voice tone, facial expression, and content of the text input, and the AI persona continuously updates its response model using reinforcement learning and past user interactions.

The face input is at least one of a facial expression, a gaze, and facial micro-expressions for stress detection and engagement tracking.

The audio input is at least one of tone, pitch, and speed.

The foregoing and/or other features and utilities of the present disclosure may also be achieved by providing a method, including selecting, by an artificial intelligence (AI) persona, at least one of a visual output and an audio output in response to a plurality of inputs based on at least one predicted query stored in a responses database, modifying, by the AI persona, at least one of the visual output and the audio output in response to changes in at least one of the plurality of inputs, while continuously refining AI persona characteristics based on recurring user interaction history, and updating, by the AI persona, the responses database in response to selection of at least one of the visual output and the audio output, ensuring persona adaptation based on evolving user preferences and contextual learning.

Selecting at least one of the visual output and the audio output includes selecting precomputed responses in the responses database based on Boolean match of the at least one predicted query and interaction history, and generating a new response in response to a failed match of the at least one predicted query and updating the responses database with the new response.

The plurality of inputs includes tracking, by the AI persona, a face of a user to detect expression, tracking, by the AI persona, gaze direction to detect eye focus, and transcribing, by the AI persona, audio input to text.

The method further includes integrating, by the AI persona, a hidden watermark into at least one of the visual output and the audio output based on steganographic encoding.

Before explaining the various embodiments of the invention in detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the terminology employed herein is for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

For a better understanding of the invention, its operating advantages and the specific objects attained by its uses, reference should be made to the accompanying drawings and descriptive matter in which there are illustrated preferred embodiments of the invention.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

The present disclosure may be better understood, and its numerous features and advantages made apparent and readily appreciated to those skilled in the art, by referencing the accompanying drawings.

The same elements or parts throughout the figures of the drawings are designated by the same reference characters.

DETAILED DESCRIPTION OF THE INVENTION

The embodiment and various embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

Figure 1:
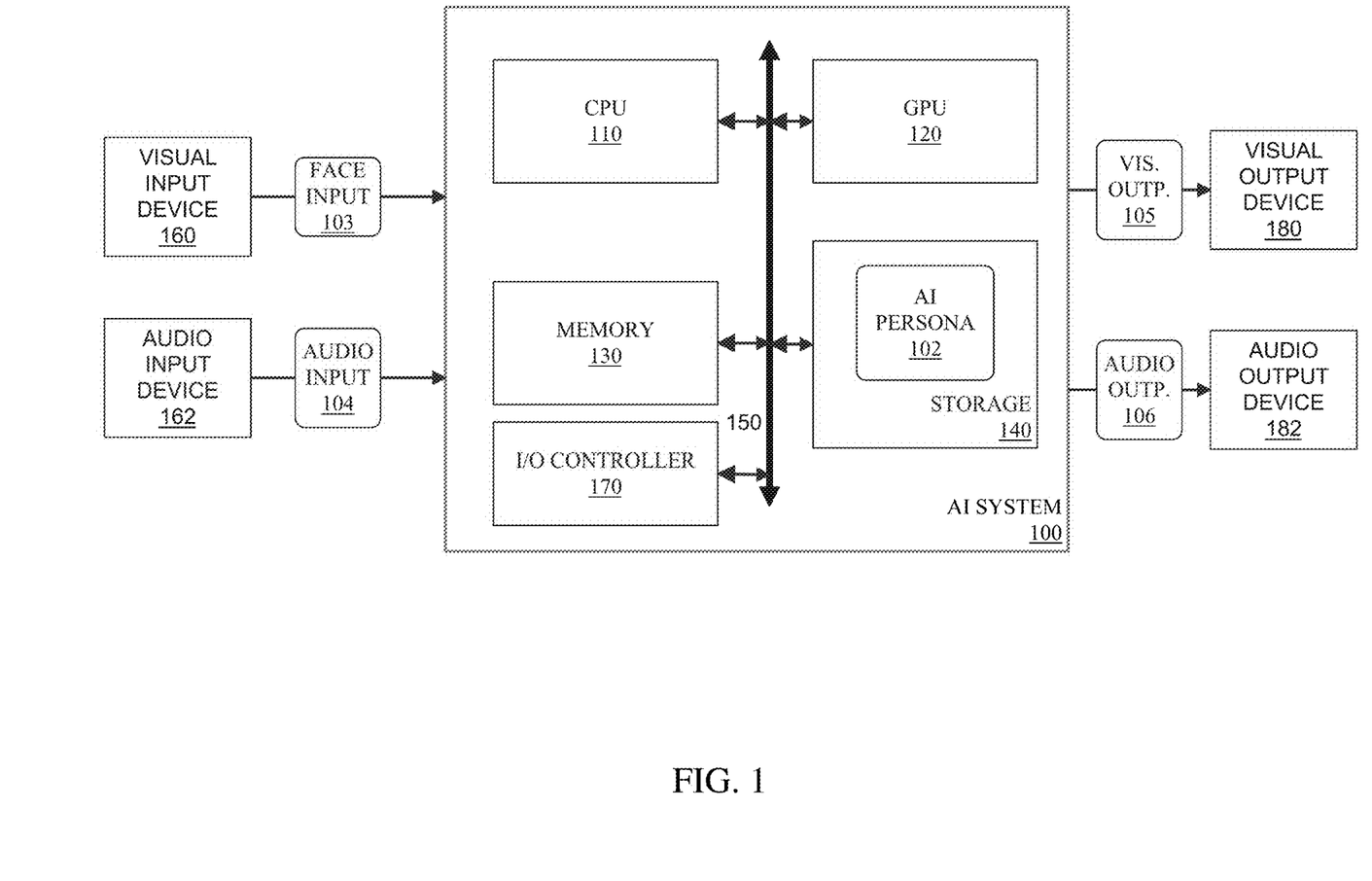
FIG. 1 is a block diagram of an artificial intelligence (AI) system that generates an AI persona that changes based on a plurality of inputs in accordance with some embodiments.

FIG. 1 illustrates a block diagram of an artificial intelligence (AI) system 100 that generates an AI persona 102 that changes based on a plurality of inputs in accordance with some embodiments. The AI system 100 is a system that generally receives different types of inputs for generating the AI persona 102 that interacts and responds to user engagement. For example, the AI persona 102 will generate a visual and an audio output in response to a query from a user. In some embodiments, the AI persona 102 is a program or computer software. However, in different embodiments, the AI persona 102 is a specialized hardware, hardcoded circuit, or hardcoded processor. Alternatively, the AI persona 102 is combination of software and hardware. Accordingly, in different embodiments, the AI system 100 includes a camera, a desktop computer, a laptop computer, a smartphone, a tablet, a microphone, a keyboard, a game console, and the like.

In some embodiments, the AI system 100 includes a central processing unit (CPU) 110, a graphics processing unit (GPU) 120, a memory unit 130, a storage unit 140, a bus 150, a visual input device 160, an audio input device 162, an input/output (I/O) controller 170, a visual output device 180, and an audio output device 182, but is not limited thereto. The CPU 110 is a processing unit that executes instructions, operations, or both based on a program, such as the AI persona 102. In other embodiments, the CPU 110 is a plurality of CPUs 110, which are not shown in the interest of clarity. That is, in other embodiments, the AI system 100 has the plurality of CPUs 110 to execute instructions and/or operations. Alternatively, and/or in addition thereto, in other embodiments, the CPU 110 includes one or more processor cores that execute instructions concurrently or in parallel.

The GPU 120 is a hardware accelerator. In other words, the GPU 120 is a highly specialized processor for performing intensive graphical instructions, operations, or both. In other embodiments, the GPU 120 is a plurality of GPUs 120, which are not shown in the interest of clarity. That is, in other embodiments, the AI system 100 has the plurality of GPUs 120 to execute instructions and/or operations. Alternatively, and/or in addition thereto, in other embodiments, the GPU 120 includes one or more processor cores that execute instructions concurrently or in parallel. Further, in different embodiments, the GPU 120 includes vector processors, coprocessors, non-scalar processors, highly parallel processors, artificial intelligence (AI) processors, inference engines, machine-learning processors, other multithreaded processing units, scalar processors, serial processors, programmable logic devices (simple programmable logic devices, complex programmable logic devices, field programmable gate arrays (FPGAs)), or any combination thereof. The GPU 120 renders a visual output (e.g., an image, a picture, a frame, a stream of frames, a video, a hologram) in response to one or more graphic instructions from the CPU 110 and based on the program, such as the AI persona 102. For sake of brevity, hereafter, collectively the CPU 110 and the GPU 120 are also referred to as one or more processing units.

The memory unit 130 is a transitory storage component such as, for example, a dynamic random-access memory (DRAM). However, in other embodiments, the memory unit 130 includes other types of memory such as, for example, static random-access memory (SRAM), and the like. The memory unit 130 further includes a memory controller, not shown for clarity. The memory controller facilitates the flow of data between the one or more processing units and the memory unit 130. Additionally, the memory controller manages read and/or write operations within memory while correcting errors (e.g., error correction) for detected errors in the memory unit 130. According to some embodiments, the memory unit 130 includes an external memory disposed external to the CPU 110 and the GPU 120 in the AI system 100. The memory unit 130 stores information or data in memory including results of any executed instructions or operations based on the AI persona 102.

The storage unit 140 may include any non-transitory storage medium. For example, the storage unit 140 includes a hard drive, an optical drive (e.g., compact disc (CD), digital versatile disc (DVD), Blu-Ray disc), non-volatile memory (e.g., read-only memory (ROM), Flash memory), and the like. In some embodiments, the storage unit 140 is disposed within the AI system 100, connected to the AI system 100 via an external port, removably connected to the AI system 100, or a cloud-based storage unit connected via a wireless or hardwired network.

The bus 150 facilitates communication between components within the AI system 100. The CPU 110 and the GPU 120 are both connected to the bus 150 and therefore communicate with each other, the memory unit 130, as well as other components, via the bus 150.

The visual input device 160 includes any type of device capable of scanning visual data. In some embodiments, the visual input device 160 is a camera, a visual data reader, an iris scanner, a facial recognition unit, and a holographic input unit, but is not limited thereto. The visual input device 160 is disposed within the AI system 100, connected to the AI system 100 via an external port, or removably connected to the AI system 100. In some embodiments, the visual input device 160 detects a face input 103 in response to a trigger, such as movement detection within a predetermined distance (e.g., 5 inches, 10 inches, 2 feet, 5 feet, etc.) and within a predetermined area (e.g., angular orientation with respect to the visual input device 160). Alternatively, and/or in addition thereto, the visual input device 160 scans and detects the face input 103 in response to a command input (e.g., take a picture, take a video, etc.) received by the visual input device 160. After the visual input device 160 detects and scans the face input 103 (e.g., a face of a user), the visual input device 160 sends the face input 103 to the memory 103 via the I/O controller 170 for processing by the one or more processing units. Specifically, the AI persona 102 includes instructions executed by the one or more processing units to generate at least one data output based on the face input 103. It will be appreciated that although the face input 103 is referred to as a singular input, the face input 103 may be a plurality of face inputs 103 such as, for example, a stream of video frames.

The audio input device 162 includes any type of device capable of scanning audio data. In some embodiments, the audio input device 162 is a microphone and a voice recognition unit. The audio input device 162 is disposed within the AI system 100, connected to the AI system 100 via an external port, or removably connected to the AI system 100. In some embodiments, the audio input device 162 detects an audio input 104 in response to a trigger, such as movement detection within a predetermined distance (e.g., 5 inches, 10 inches, 2 feet, 5 feet, etc.) and within a predetermined area (e.g., angular orientation with respect to the audio input device 162). Alternatively, and/or in addition thereto, the audio input device 162 scans and detects the audio input 104 in response to a command input (e.g., record an utterance, record speech, etc.) received by the audio input device 162. After the audio input device 162 detects and scans the audio input 104 (e.g., a voice of a user), the audio input device 162 sends the audio input 104 to the memory 103 via the I/O controller 170 for processing by the one or more processing units. Specifically, the AI persona 102 includes instructions executed by the one or more processing units to generate at least one data output based on the audio input 103. It will be appreciated that although the audio input 104 is referred to as a singular input, the audio input 104 may be a plurality of audio inputs 104 such as, for example, a stream of audio.

In some embodiments, the AI system 100 includes the input/output (I/O) controller 170 that includes circuitry to handle input or output operations, as well as other elements of the AI system 100 such as keyboards, mice, printers, external disks, and the like. The I/O controller 170 is connected to the bus 150 so that the I/O controller 170 communicates with CPU 110, the GPU 120, the memory unit 130, and the storage unit 140.

Furthermore, additional types of input devices may be connected to the AI system 100, but are not shown for clarity. For example, additional input devices include an input keyboard, a touchpad, a mouse, a trackball, a stylus, a wireless device reader, and a fingerprint reader.

Based on instructions from the AI persona 102, the one or more processing units execute instructions to generate a persona. More specifically, the AI persona 102 is a deep learning facial animation model that mimics human facial expressions, human behaviors, exhibits emotional awareness, emotion detection, and predicts responses to a query (e.g., a text input, a visual/video/face input, an audio/voice input) from the user in conversation. To exhibit natural reaction and human likeness, the AI persona 102 evaluates a plurality of inputs. For example, the AI persona 102 receives the face input 103 and the audio input 104 and generates a response (e.g., a visual output and an audio output) based on the face input 103 and the audio input 104.

Furthermore, the AI persona 102 may be customized and trained by employing other data formats to ensure an adaptive and contextually rich experience with the AI persona 102. In addition to the face input 103 and the audio input 104, the user may submit a direct text input, such as, for example, from an input keyboard or a stylus (e.g., text input from hand movement). Other data formats include at least one website, documents (e.g., PDF, TXT, PPT, XML, HTML, and the like), and images (e.g., PNG, JPG, TIFF, GIF, SVG, BMP, and the like). Each of the data formats are received by the AI persona 102 for data ingestion and adaptation to the user for the AI persona 102. Moreover, each data format may include different types of content to construct the AI persona 102. To illustrate, the text used for customization may include articles, transcripts, and/or notes. The audio used for customization may include voice recordings and/or podcasts. The video used for customization may include speech-driven media and/or recorded interviews. The websites used for customization may include eBooks and/or scanned notes. Finally, the images used for customization may include handwritten notes and/or scanned documents.

The AI persona 102 processes the data formats by extracting any information contained therein and used by the AI persona 102 to construct and personalize the rendered persona for the user. The AI persona 102 includes a speech-to-text engine to translate each portion of the audio input 104 into a text query. That is, the audio input 104 is translated to text for additional processing (i.e., entering text-based commands) by the AI persona 102. Alternatively, and/or in addition thereto, the AI persona 102 receives a text query using a direct text input. It is important to note that the AI persona 102 does not need to perform speech conversion for the direct text input. Also, the AI persona 102 includes optical character recognition (OCR) to extract text from images and/or documents (e.g., PDF) that cannot easily extract text. Websites are parsed to retrieve meaningful information. In response to generating the persona, the AI persona 102 embeds content extracted from each data format into a context-aware vector that is stored in the embedded database within the storage unit 140. By employing a vector format to store data, the AI persona 102 generates an index within the embedded database that facilitates rapid retrieval and context awareness. For example, history books, history-focused websites, and/or scanned historical images are used to customize the AI persona 102 into an AI historian persona that retrieves accurate information from the different data formats.

In response to receiving the text query, the AI persona 102 evaluates the text query using an input recognition and comparison (IRC) module. Specifically, the IRC module checks whether the text query has been input (i.e., requested) before, and therefore, is categorized as a preexisting query, or is instead a new query. For a preexisting query (PQ), the IRC module confirms presence of the PQ within an embedded database generated by the AI persona 102 and stored within the storage unit 140. A response lookup module retrieves a preexisting response (a.k.a. a cached response) from a preexisting response (PR) database generated by the AI persona 102 within the storage unit 140 for near-instantaneous delivery of a response. It is important to note that hereinafter, the embedded database and the PR database are described as part of the storage unit 140. However, in different embodiments, the embedded database and the PR database may be in separate, individual storage units (e.g., two storage units) or even stored across a plurality of storage units. In this manner, the cached response substantially reduces latency and provides a faster response for engagement with the user. Hereafter, use of the term, module, refers to a program or computer software for clarity. However, in different embodiments, a module is a specialized hardware, hardcoded circuit, or hardcoded processor. Alternatively, a module is implemented as a combination of software and hardware.

Alternatively, the AI persona 102 employs a text generation (TG) module that includes a large language model (LLM) trained using large amounts of text and data to facilitate text generation. Moreover, in response to the IRC detecting a new query, the TG module generates a new response in response to the IRC module confirming absence of the PQ within the embedded database. Stated differently, the absence of the PQ indicates the new query has never been presented to the AI persona 102 and the AI persona 102 must generate a response relevant and responsive to the new query. Also, the AI persona 102 stores the new query in the embedded database. The TG module transmits the new response or a generated response to a response variant generator (RVG). The RVG includes an LLM trained using large amounts of text and data to facilitate text generation. In particular, the RVG generates a plurality of responses for the new query. As such, the AI persona 102 presents at least one of the plurality of responses based on the new query, as well as additional context. For example, each of the plurality of responses is based on additional factors, such as context of the query, tone of voice in the audio input 104, facial expressions detected in the face input 103, and the like. The RVG stores the plurality of responses in the PR database.

While the TG module generates the new response, a conversation anticipation engine (CAE) operates in parallel. Hereafter, use of the term, engine, refers to a program or computer software for clarity. However, in different embodiments, an engine is a specialized hardware, hardcoded circuit, or hardcoded processor. Alternatively, an engine is implemented as a combination of software and hardware. The CAE analyzes the text input and continued conversation history (e.g., additional utterance and input or query from the user) to predict future queries (i.e., possible queries) and responses. To expedite responsiveness, the AI persona 102 employs the CAE to precompute queries and responses to quickly offer cached responses based on precomputed queries from further inputs by the user and reduce latency.

As described above, the AI persona 102 either retrieves the cached response from the PR database or the AI persona 102 must generate a new response based on a new query that has not been encountered before. In both situations, the cached response or the new response is sent to a context-and-emotion aware audio generation (CEAAG) module. The CEAAG module receives the face input 103 and the audio input 104 in addition to the responses. The CEAAG module generates an audio output 106. The CEAAG module modifies the audio output 106 employing speech synthesis to reflect the emotional state of the user including parameters, such as pitch, speed, cadence, and tone. Further, the CEAAG module adjusts engagement style based on recurring sentiment trends and detected behavioral patterns of the user. In this manner, the audio output 106 will exhibit empathy for the user during conversation. Furthermore, the AI persona 102 employs an emotion aware animated persona generation (EAAPG) module that generates an animated model (e.g., a persona) and outputs a visual output 105. The EAAPG module synchronizes facial expressions, lip movements, stress levels, and micro-expressions (e.g., mood shifts). The EAAPG module responds in real-time to exhibit a natural and human-like persona. It will be appreciated that although the audio output 106 and the visual output 105 are referred to as a singular output, the visual output 105 and the audio output 106 may be a plurality of visual outputs 105 and a plurality of audio outputs 106 such as, for example, a stream of video frames and a stream of audio, respectively.

The visual output device 180 includes any type of device capable of outputting visual data. The visual output device 180 may include a plasma screen, an LCD screen, a light emitting diode (LED) screen, an organic LED screen, a computer monitor, a hologram output unit, a sound outputting unit, or any other type of device that visually or aurally displays data. The visual output device 180 is disposed within the AI system 100, connected to the AI system 100 via an external port, or removably connected to the AI system 100. The visual output device 180 displays the visual output 105 thereon.

The audio output device 182 includes any type of device capable of outputting audio data. The audio output device 182 may include a speaker and any other type of sound outputting unit. The audio output device 182 is disposed within the AI system 100, connected to the AI system 100 via an external port, or removably connected to the AI system 100. The audio output device 182 emits the audio output 106 therefrom.

In some embodiments, the AI persona 102 offers refinement of persona characteristics that adjusts over time and reinforces certain responses based on learning over user behavior. For example, the AI persona 102 has selectable communication styles, such as formal or conversational. The AI persona 102 has different tones for responding, such as empathetic or authoritative. It will be appreciated that despite user customization, the AI persona 102 will modify the visual output 105 and the audio output 106 (e.g., facial expressions, communication style, and tone) as needed based on interaction with the user. The modification of communication by the AI persona 102 may include extracting different predicted responses already stored in the storage unit 140 or generating a new response depending on the query input from the user. For example, the user may select the AI persona 102 to operate as an AI therapist and use a tone that is calming and empathetic during communication. However, the AI persona 102 will modify conversation features (e.g., the tone and facial features) of the visual output 105 and the audio output 106 via a feedback loop in response to detected changes in context from the face input 103 (e.g., frowning, smiling, changing eye gaze, etc.) and/or the audio input 104 (e.g., change in speech pattern, slower speech, increased volume, etc.). The feedback loop is real-time adaptation by the AI persona 102 to continuous input changes from the user and adjust the persona accordingly. Moreover, the AI persona 102 refines conversation engagement through learning from past interactions to ensure future conversations are personalized to the user and demonstrate emotional alignment to the user. That is, the AI persona 102 uses reinforcement learning-based adaptation for the AI persona refinement over time.

In other embodiments, the AI persona 102 processes the plurality of inputs and generates responses using encryption and secure storage protocols. To prevent tampering and ensure secure interactions with the user, the AI persona 102 employs invisible watermarks applied to generated responses and encryption signatures to maintain authenticity and prevent unauthorized use. The watermarks may be applied to the audio output and the visual output using steganographic encoding to prevent unauthorized replication and to verify AI-generated integrity. The watermarks identify responses that have not been modified by an external entity. The AI persona 102 includes a public key verification process that allows authorized users and third parties to verify the generated response is authentic. Moreover, the AI persona 102 has a safeguard layer to continuously monitor the generated responses to ensure they align with data protection laws and ethical guidelines, such as, for example HIPAA, CCPA, GDPR, and SOC II Type II. In other embodiments, the AI persona 102 includes a compliance module with bias detection to ensure the generated responses are fair, balanced, and free from discrimination.

In other embodiments, the AI persona 102 continuously monitors conversations to ensure accuracy and adaptability. The AI persona 102 scans generated responses for speech inconsistencies, contextual mismatches, and sentiment misalignment for possible errors. The AI persona 102 adjusts or modifies any of the generated responses in response to detecting the errors. In particular, the AI persona 102 may modify response strategy, language complexity, speech pacing, and engagement style to enhance communication clarity. Also, in some embodiments, the AI persona 102 employs predictive correction models. That is, the AI persona 102 anticipates and resolves potential errors in the generated responses before occurrence. As such, the AI persona 102 mitigates errors, and maintains cohesion and engagement during conversation.

Figure 2:
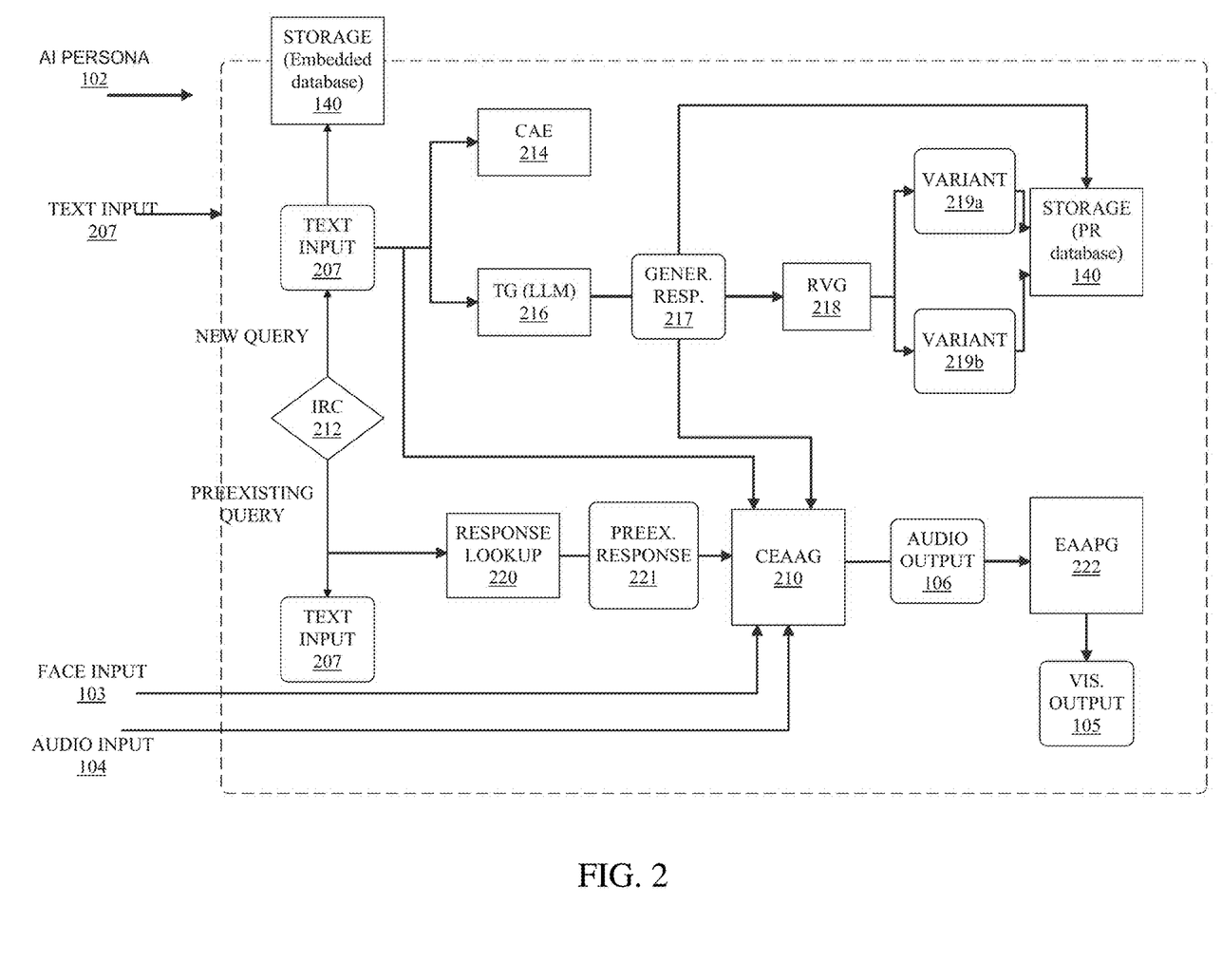
FIG. 2 is a block diagram illustrating components used by an AI persona to generate a response based on a plurality of inputs and adapt the AI persona to the plurality of inputs in accordance with some embodiments.

FIG. 2 illustrates a block diagram of components used by an AI persona 102 to generate a response based on a plurality of inputs and adapt the AI persona 102 to the plurality of inputs in accordance with some embodiments. In some embodiments, the AI persona 102 includes a CEAAG module 210, an IRC module 212, a CAE 214, a TG module 216, an RVG 218, a response lookup module 220, and an EAAPG module 222, but is not limited thereto. The AI persona 102 employs the CEAAG module 210 to generate the audio output 106. Specifically, the CEAAG module 210 generates the audio output 106 in response to the AI persona 102 receiving the face input 103, the audio input 104, and a text input 207. The text input 207 may be a direct text input from an input device, such as, for example, from an input keyboard or a stylus. The CEAAG module 210 extracts context from the text query and detects emotional tone from the text input 207, the face input 103, and the audio input 104. The CEAAG module 210 examines spoken words, pitch, and tone from the audio input 104, as well as, facial movements, stress detection, and facial micro-expressions from the face input 103.

To extract context from the text query, the CEAAG module 210 includes AI models. For example, in some embodiments, the CEAAG module 210 includes generative pre-trained transformer models (GPT), bidirectional encoder representations from transformers (BERT), and multimodal transformers. Based on the AI models, the CEAAG module 210 analyzes word relationships to extract context. To analyze speech emotion, the CEAAG module 210 includes deep learning models. For example, in some embodiments, the CEAAG module 210 includes a convolutional neural network (CNN), a Wave2Vec model, and a recurrent neural network (RNN). Based on the deep learning models, the CEAAG module 210 analyzes speech to recognize speech patterns, vocabulary, and dictation. Finally, the CEAAG module 210 employs facial recognition models. For example, in some embodiments, the CEAAG module 210 extracts facial expressions (e.g., muscle movement for happiness, sadness, frustration), stress level (e.g., sweat on the face, face twitches), facial micro-expressions (e.g., subtle emotional cues), and eye gaze patterns (e.g., indicative of user attention and focus). Also, the CEAAG module 210 analyzes facial landmarks for positioning and orientation, such as eye location, nose location, ear location, mouth location, and the like.

In generating the audio output 106, the CEAAG module 210 combines inputs from the AI models, the deep learning models, and the facial recognition models to generate the audio output 106. The CEAAG module 210 generates the audio output 106 with emotion based on the inputs. To illustrate via an example, the CEAAG module 210 receives the text input 207 stating "I'm having a great day," the audio input 104 indicates the user has a low tone and indicates the user is actually upset, and the face input 103 indicates the user has a neutral expression. The CEAAG module 210 generates the audio output 106 with empathy having a comforting tone and moderate volume to offer a comforting persona. The AI persona 102 will further modify the response tone of the audio output 106 based on detected emotion from the inputs. The CEAAG module 210 modifies the audio output 106 employing speech synthesis corresponding to the emotional state of the user including parameters, such as pitch, speed, cadence, and tone. Further, the CEAAG module 210 adjusts engagement style based on recurring sentiment trends and detected behavioral patterns of the user. In this manner, the AI persona 102 will exhibit empathy for the user during conversation based on changes in the audio output 106.

Furthermore, the CEAAG module 210 receives the text input 207 from the IRC module 212. The IRC module 212 evaluates the text input 207 based on whether the text input 207 is similar to a prior text input (i.e., has been requested before). The IRC module 212 identifies the text input 207 as a PQ that has been precomputed by the CAE 214 in response to confirming presence of the PQ in the embedded database within the storage unit 140. The response lookup module 220 retrieves a preexisting response (PR) 221 (a.k.a. a cached response 221) from the PR database generated by the AI persona 102 within the storage unit 140 for near-instantaneous delivery of a response. It is important to note that the PR 221 corresponds to the PQ and may be one of a plurality of variants of preexisting responses discussed below. In this manner, the cached response 221 substantially reduces latency and provides a faster response for engagement with the user. Accordingly, the PR response 221 is sent to the CEAAG module 210 to generate the audio output 106 based on the PR response 221.

In the scenario where the IRC module 212 detects the text input 207 as a new query, the AI persona 102 employs the TG module 216 that includes an LLM trained using large amounts of text and data to facilitate text generation. The TG module 216 generates a generated response 217 in response to the IRC module 212 confirming absence of the PQ within the embedded database. Stated differently, the absence of the PQ indicates the new query has never been presented to the AI persona 102 and the AI persona 102 must generate the generated response 217 that is relevant and responsive to the new query. Also, the AI persona 102 stores the new query in the embedded database within the storage unit 140 as well as precomputes additional variant queries based on the new query. It will be appreciated that although the embedded database and the PR database are referred to as being on the same storage unit 140. In different embodiments, the embedded database and the PR database are on separate storage units 140. The TG module 216 transmits the generated response 217 to the RVG 218. The RVG 218 includes an LLM trained using large amounts of text and data to facilitate text generation. In particular, the RVG 218 generates a plurality of variant generated responses 219a, 219b for the new query. FIG. 2 depicts the plurality of variant generated responses as a variant generated response 219a and a variant generated response 219b for clarity. However, in various embodiments, the plurality of variant generated response includes more than two variant generated responses. Each of the plurality of variant generated responses 219a, 219b is responsive to the new query and is based on additional factors, such as context of the text input 207, tone of voice in the audio input 104, facial expressions detected in the face input 103, and the like. As such, the AI persona 102 presents at least one of the plurality of responses based on the new query, as well as additional context. The RVG 218 stores the plurality of variant generated responses 219a, 219b in the PR database.

The CAE 214 operates in parallel with the TG module 216. The CAE 214 analyzes the text input 207 and continued conversation history (e.g., additional utterance and input or query from the user) to predict future queries (i.e., possible queries) and responses. To expedite responsiveness, the AI persona 102 employs the CAE 214 to precompute queries and responses to quickly offer cached responses from further inputs and reduce latency. The CAE 214 stores the precomputed queries in the embedded database and the precomputed responses within the PR database. The precomputed queries are variant queries that anticipate future queries from the user and have corresponding responses that are responsive to those queries.

After generating the audio output 106, the CEAAG module 210 sends the audio output 106 to the EAAPG module 222. The EAAPG module 222 generates an animated model (e.g., a persona) and outputs a visual output 105. The EAAPG module 222 synchronizes facial expressions, lip movements, and micro-expressions (e.g., mood shifts) to the audio output 106. For example, the EAAPG module 222 extracts phoneme sequences and matches them to a facial animation library to ensure precise and accurate lip-sync alignment. Also, animated facial micro-expressions and emotion intensity is generated dynamically to respond to inputs from the user. The EAAPG module 222 responds in real-time to exhibit a natural and human-like persona. Accordingly, the EAAPG module 222 ensures fluid and natural engagement of the AI persona 102 during conversation with the user.

Figure 3:
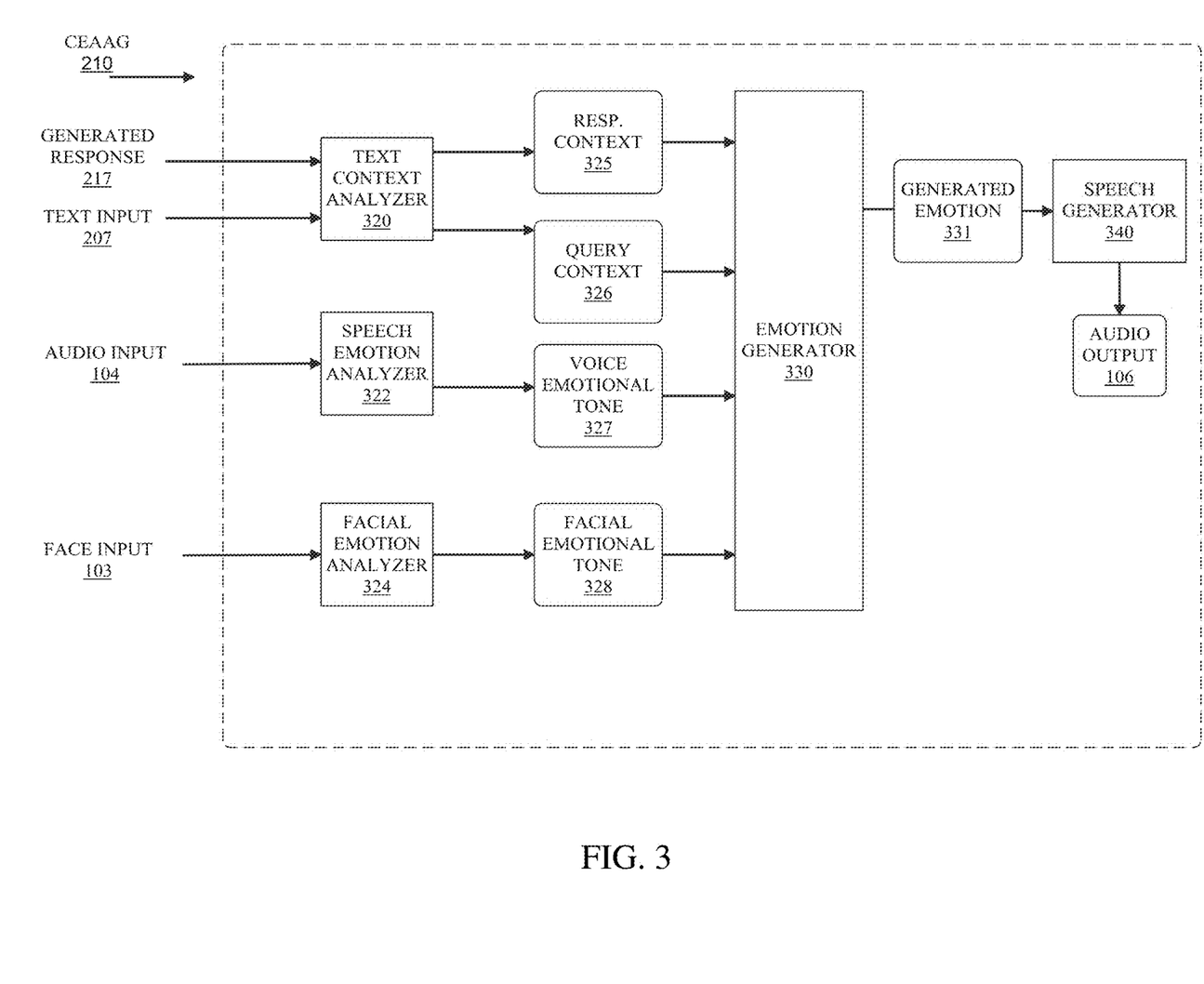
FIG. 3 is a block diagram of a context-and-emotion aware audio generator (CEAAG) that uses deep learning models and facial recognition to generate speech based on emotion in accordance with some embodiments.

FIG. 3 is a block diagram of a context-and-emotion aware audio generator (CEAAG) module 210 that uses deep learning models and facial recognition to generate speech based on emotion in accordance with some embodiments. To synthesize speech that reflects the emotional state of the user, the CEAAG module 210 employs different analyzers for each type of the plurality of inputs. In some embodiments, the CEAAG module 210 includes a text context analyzer 320, a speech emotion analyzer 322, a facial emotion analyzer 324, an emotion generator 330, and a speech generator 340, but is not limited thereto. As described above, the AI persona 102 employs the CEAAG module 210 to generate the audio output 106. Specifically, the CEAAG module 210 generates the audio output 106 in response to the AI persona 102 receiving the face input 103, the audio input 104, and the text input 207. The text context analyzer 320 receives the text input 207 and analyzes the text input 207 for context, such as order of words and type of words used. To extract context from the text query, the text context analyzer 320 implements at least one AI model.

For example, in some embodiments, the text context analyzer 320 includes generative pre-trained transformer models (GPT), bidirectional encoder representations from transformers (BERT), and multimodal transformers. Based on the AI models, the text context analyzer 320 analyzes word relationships to extract context. Furthermore, in some embodiments, the text context analyzer 320 receives the generated response 217 sent from the TG module 216 described above. The text context analyzer 320 analyzes the generated response 217 in the same manner as the text input 207. It will be appreciated that while FIG. 3 depicts the text context analyzer 320 as a single component, in different embodiments, the text input 207 and the generated response 217 are sent to individually separate text context analyzers 320 (e.g., two context analyzers). The text context analyzer 320 sends a response context result 325 to the emotion generator 330 in response to completing analysis of the generated response 217. Similarly, the text context analyzer 320 sends a text context result 326 to the emotion generator 330 in response to completing analysis of the text input 207.

The speech emotion analyzer 322 receives and analyzes the audio input 104 for context, such as words used and manner of speech. To analyze speech emotion, the speech emotion analyzer 322 includes deep learning models. For example, in some embodiments, the speech emotion analyzer 322 includes a convolutional neural network (CNN), a Wave2Vec model, and a recurrent neural network (RNN). Based on the deep learning models, the speech emotion analyzer 322 analyzes speech to recognize speech patterns, vocabulary, and dictation. The speech emotion analyzer 322 sends a voice emotional tone result 327 to the emotion generator 330 in response to completing analysis of the audio input 104.

The facial emotion analyzer 324 receives and analyzes the face input 103 for context, such as facial recognition. To analyze facial emotions and facial expressions, the facial emotion analyzer 324 includes facial recognition models. For example, in some embodiments, the facial emotion analyzer 324 extracts facial expressions, facial micro-expressions, and eye gaze patterns. Based on the facial recognition models, the facial emotion analyzer 324 analyzes the face to recognize face and eye movements. The facial emotion analyzer 324 sends a facial emotional tone result 328 to the emotion generator 330 in response to completing analysis of the face input 103.

The emotion generator 330 employs neural fusion to combine emotion signals from the response context result 325, the text context result 326, the voice emotional tone result 327, and the facial emotional tone result 328. That is, the emotion generator 330 employs neural fusion to combine multiple data sets to facilitate speech generation. As such, the emotion generator 330 modifies emotional tone response based on emotion detected in the results from each analyzer. After combining the emotion signals, the emotion generator 330 generates a generated emotion 331 and send the generated emotion 331 to the speech generator 340. The speech generator 340 employs speech synthesis and AI models to fine tune the speech and generate the audio output 106. In particular, the speech generator 340 modifies at least one of tone, pitch, speed, and resonance to match emotional sentiment of the user. To illustrate via an example, the speech generator 340 may modify the pitch and tone of the audio output 106 prior to generating the audio output 106 in response to the emotion signals indicating an excited user that smiles and/or screams with joy. Based on these signals, the speech generator 340 elevates the pitch and tone to match the emotional sentiment of the user.

Figure 4:
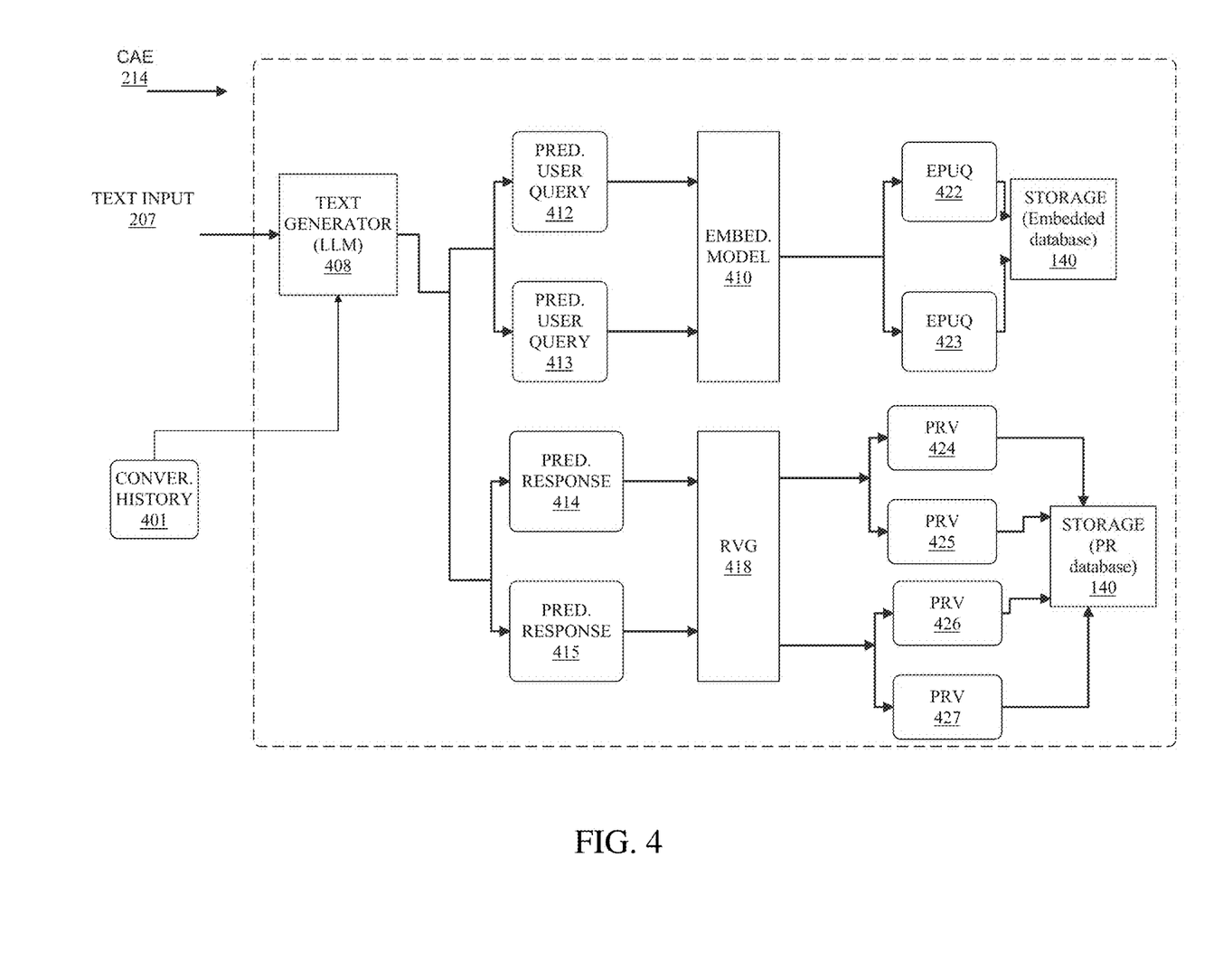
FIG. 4 is a block diagram of a conversation anticipation engine (CAE) that converts predicted queries into embedded models and a response variant generator (RVG) to generate multiple responses for each predicted query in accordance with some embodiments.

FIG. 4 is a block diagram of a conversation anticipation engine (CAE) 214 that converts predicted queries into embedded models and a response variant generator (RVG) 218 to generate multiple responses for each predicted query in accordance with some embodiments. To expedite responsiveness, the AI persona 102 employs the CAE 214 to precompute queries and responses to quickly offer cached responses from further inputs and reduce latency. In some embodiments, the CAE 214 includes a text generator 408, an embedding model 410, and an RVG 418, but is not limited thereto. The text generator 408 and the RVG 418 operate similar to the TG module 216 and the RVG 218 as described above with respect to FIG. 2. The text generator 408 receives and analyzes the text input 207 and a conversation history 401 (e.g., additional utterance and input or query from the user) to predict and compute future queries (i.e., possible queries) and responses. The text generator 408 generates and predicts content for a plurality of predicted user queries 412, 413 and a plurality of predicted responses 414, 415 in parallel based on the text input 207 and the conversation history 401. FIG. 4 depicts the plurality of predicted user queries as a predicted user query 412 and a predicted user query 413 for clarity. However, in various embodiments, the plurality of predicted user queries includes more than two predicted user queries. Also, FIG. 4 depicts the plurality of predicted responses as a predicted response 414 and a predicted response 415 for clarity. However, in various embodiments, the plurality of predicted responses includes more than two predicted responses.

To predict the plurality of predicted user queries 412, 413 and the plurality of predicted responses 414, 415, the text generator 408 extracts prior interactions from the conversation history 401 to identify a process of how future queries are provided based on a conversation and the responses to those questions using pattern recognition and a sequential LLM inference. Also, the text generator 408 identifies identities, context, and intent from the text input 207. To illustrate via an example, the text generator 408 extracts the text input 207 content as a question, "What are the best colleges in my state?" The text generator 408 extracts other types of questions and responses from conversation history as "What grades do I need for college?", "What extracurricular activities help my college candidacy?", "The best colleges often look for a grade point average over 3.5", and "Participation on the debate team is favored by the best colleges", respectively. The text generator 408 sends the plurality of predicted user queries 412, 413 to the embedding model 410 and the plurality of predicted responses 414, 415 to the RVG 418. The embedding model 410 converts each of the plurality of predicted user queries 412, 413 into a high dimensional vector as a plurality of embedded predicted user queries (EPUQ) 422, 423. The embedding model 410 embeds each of the plurality of predicted user queries 412, 413 into a context-aware vector that is stored in the embedded database within the storage unit 140. By employing a vector format to store the plurality of EPUQ 422, 423, the embedding model 410 generates an index within the embedded database that facilitates rapid retrieval and context awareness. Moreover, the text generator 408 anticipates follow-up questions to a given query to match responses to those queries for faster response times and substantially eliminate (e.g., nearly zero) latency.

The RVG 418 generates (i.e., precomputes) a plurality of predicted response variants (PRV) for each of the plurality of predicted responses 414, 415. Specifically, the RVG 418 generates a set of a plurality of PRV 424, 425 for the predicted response 414 and another set of a plurality of PRV 426, 427 for the predicted response 415. As such, the plurality of PRV 424, 425 represents alternative types of responses for answering a first query relevant to those responses. Similarly, the plurality of PRV 426, 427 represent alternative type of responses for answer a second query different from the first query. For example, a first query from the user "how can I improve my sleep?" The PRV 424 may be a response related to better sleep hygiene while the PRV 425 may be a response discussing cognitive behavioral therapy. As another example, a second query from the user "what can help me with meditation?" The PRV 426 may discuss aroma therapy while the PRV 427 may discuss using calm music. Accordingly, the RVG 418 diversifies the AI persona 102 response to prevent repetitive output. The RVG 418 performs multi-pass validation to ensure contextual accuracy for each predicted response. Also, the plurality of PRV 424, 425, 426, 427 are personalized responses based on interaction history with the user. The RVG 418 stores the precomputed queries in the embedded database. The RVG 418 stores the precomputed responses within the PR database. FIG. 4 depicts the plurality of PRV 424, 425 as the PRV 424 and the PRV 425 for clarity. However, in various embodiments, the plurality of PRV includes more than two PRVs. The same description applies to the plurality of PRV 426, 427.

Figure 5:
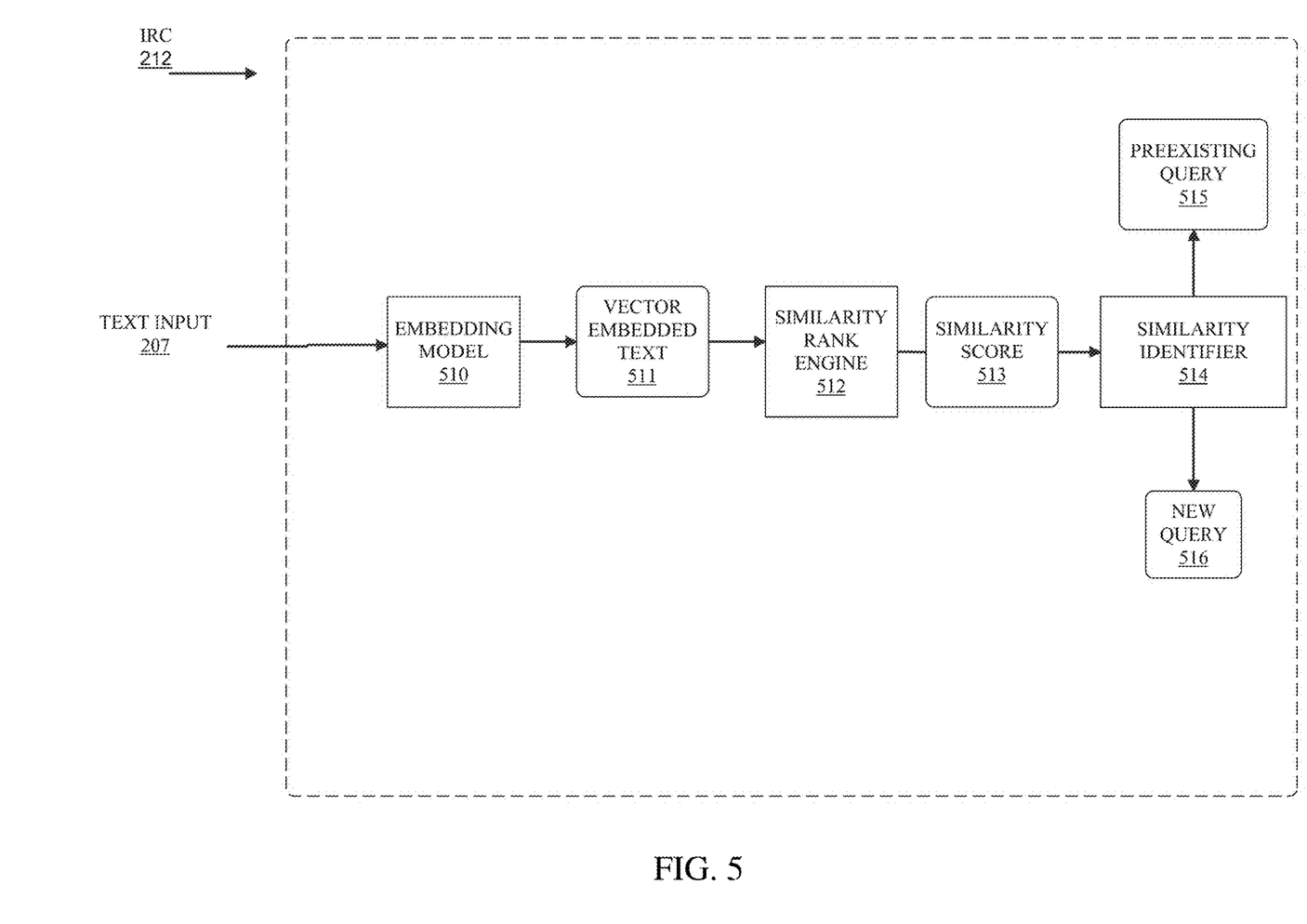
FIG. 5 is a block diagram of an input recognition and comparison (IRC) module to compare a query to a preexisting stored query in a database using vector similarity matching and retrieve a precomputed response for a matched query in accordance with some embodiments.

FIG. 5 is a block diagram of an input recognition and comparison (IRC) module 212 to compare a query to a preexisting stored query in a database using vector similarity matching and retrieve a precomputed response for a matched query in accordance with some embodiments. To ensure accuracy in response to queries, the AI persona 102 employs the IRC module 212 to evaluate whether the text input 207 is new query or is a preexisting query (i.e., same or similar to a prior query). In some embodiments, the IRC module 212 includes an embedding model 510, a similarity rank engine (SRE) 512, and a similarity identifier module 514, but is not limited thereto. The embedding model 510 converts the text input 207 into a high dimensional context-aware vector as a vector embedded text 511. The embedding model 510 employs deep learning embedding models to perform the conversion. The embedding model 510 sends the vector embedded text 511 to the SRE 512.

The SRE 512 compares the vector embedded text 511 to prior queries. In some embodiments, the SRE 512 may retrieve the prior queries (e.g., EPUQ 422, 423) from the embedded database, not shown for clarity. In some embodiments, the SRE 512 employs a cosine similarity algorithm to generate at least one similarity score 513 based on comparisons to each of the prior queries. That is, there may be a plurality of similarity scores 513 for the plurality of EPUQ 422, 423. The SRE 512 sends the at least one similarity score 513 to the similarity identifier 514. The similarity identifier 514 compares the at least one similarity score 513 to a similarity threshold. Thus, in some embodiments, the similarity identifier 514 indicates the vector embedded text 511 is similar to at least one prior query in response to the at least one similarity score 513 exceeding and/or matching (e.g., greater than or equal to) the similarity threshold. As such, the similarity identifier 514 indicates the vector embedded text 511 is not similar to at least one prior query in response to the at least one similarity score 513 falling below the similarity threshold. As described above, the vector embedded text 511 matching the similarity threshold indicates at least one precomputed response (e.g., the PRV 424, 425, 426, 427) may be used and can be rapidly extracted. In this manner, the precomputed or cached response substantially reduces latency and provides a faster response for engagement with the user. Alternatively, the vector embedded text 511 falling below the similarity threshold requires the TG module 216 to generate the generated response 217 to provide a response based on the new query.

Figure 6:
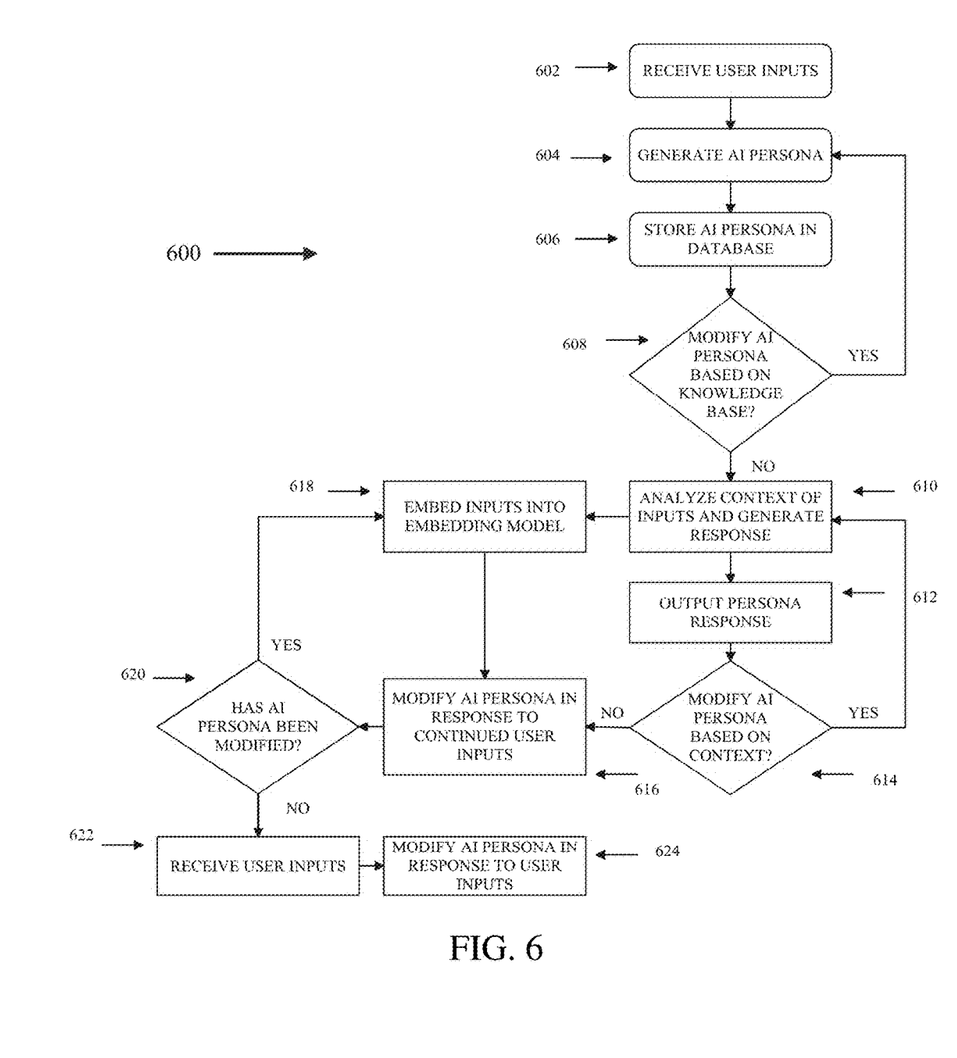
FIG. 6 is a flow diagram illustrating a method for generating the AI persona that changes based on a plurality of inputs in accordance with some embodiments.

FIG. 6 is a flow diagram illustrating a method 600 for generating the AI persona 102 that changes based on a plurality of inputs in accordance with some embodiments. The method 600 is described with respect to an example implementation of the AI system 100 of FIG. 1 and FIG. 2. At block 602, the visual input device 160 detects a face input 103 in response to a trigger, such as movement detection within a predetermined distance and within a predetermined area. Alternatively, and/or in addition thereto, the visual input device 160 scans and detects the face input 103 in response to a command input received by the visual input device 160. Also, the audio input device 162 detects an audio input 104 in response to a trigger, such as movement detection within a predetermined distance and within a predetermined area. Alternatively, and/or in addition thereto, the audio input device 162 scans and detects the audio input 104 in response to a command input (e.g., record an utterance, record speech, etc.) received by the audio input device 162.

At block 604, based on instructions from the AI persona 102, the one or more processing units execute instructions to generate a persona. To exhibit natural reaction and human likeness, the AI persona 102 evaluates a plurality of inputs. For example, the AI persona 102 receives the face input 103 and the audio input 104 and generates outputs based on the face input 103 and the audio input 104. At block 606, in response to generating the persona, the AI persona 102 embeds content extracted from each data format into a vector that is stored in the embedded database within the storage unit 140.

At block 608, the AI persona 102 offers refinement of persona characteristics. The AI persona 102 will modify the visual output 105 and the audio output 106 as needed based on interaction with the user. Moreover, the AI persona 102 will modify conversation features of the visual output 105 and the audio output 106 via a feedback loop in response to detected changes in context from the face input 103 and/or the audio input 104. At block 610, the CEAAG module 210 retrieves context from the text query and detects emotional tone from the text input 207, the face input 103, and the audio input 104. The CEAAG module 210 examines spoken words, pitch, and tone from the audio input 104, as well as, facial movements and facial micro-expressions from the face input 103. In generating the audio output 106, the CEAAG module 210 combines inputs from the AI models, the deep learning models, and the facial recognition models to generate the audio output 106. At block 612, the CEAAG module 210 generates the audio output 106 with emotion based on the inputs. At block 614, the AI persona 102 checks whether the text input, user expressions, tone, and/or any other inputs have changed. If the inputs have changed, the method returns to block 610. If the inputs have not changed, the method moves on to block 616. At block 616, the AI persona 102 will further modify the response tone of the audio output 106 based on detected emotion from the inputs. The CEAAG module 210 modifies the audio output 106 employing speech synthesis to reflect the emotional state of the user including parameters, such as pitch, speed, cadence, and tone.

At block 618, in response to generating the persona, the AI persona 102 embeds content extracted from each data format into a vector that is stored in the embedded database within the storage unit 140. At block 620, the AI persona 102 checks whether the persona has been modified based on changes to the inputs. If the inputs have changed, the method returns to block 618. If the AI persona 102 moves on to block 622. At block 622, the AI persona 102 receives additional inputs during user interaction, such as the text input 207, the face input 103, and/or the audio input 104. At block 624, the AI persona 102 will modify conversation features of the visual output 105 and the audio output 106 via a feedback loop in response to detected changes in context from the text input 207, the face input 103, and/or the audio input 104.

Figure 7:
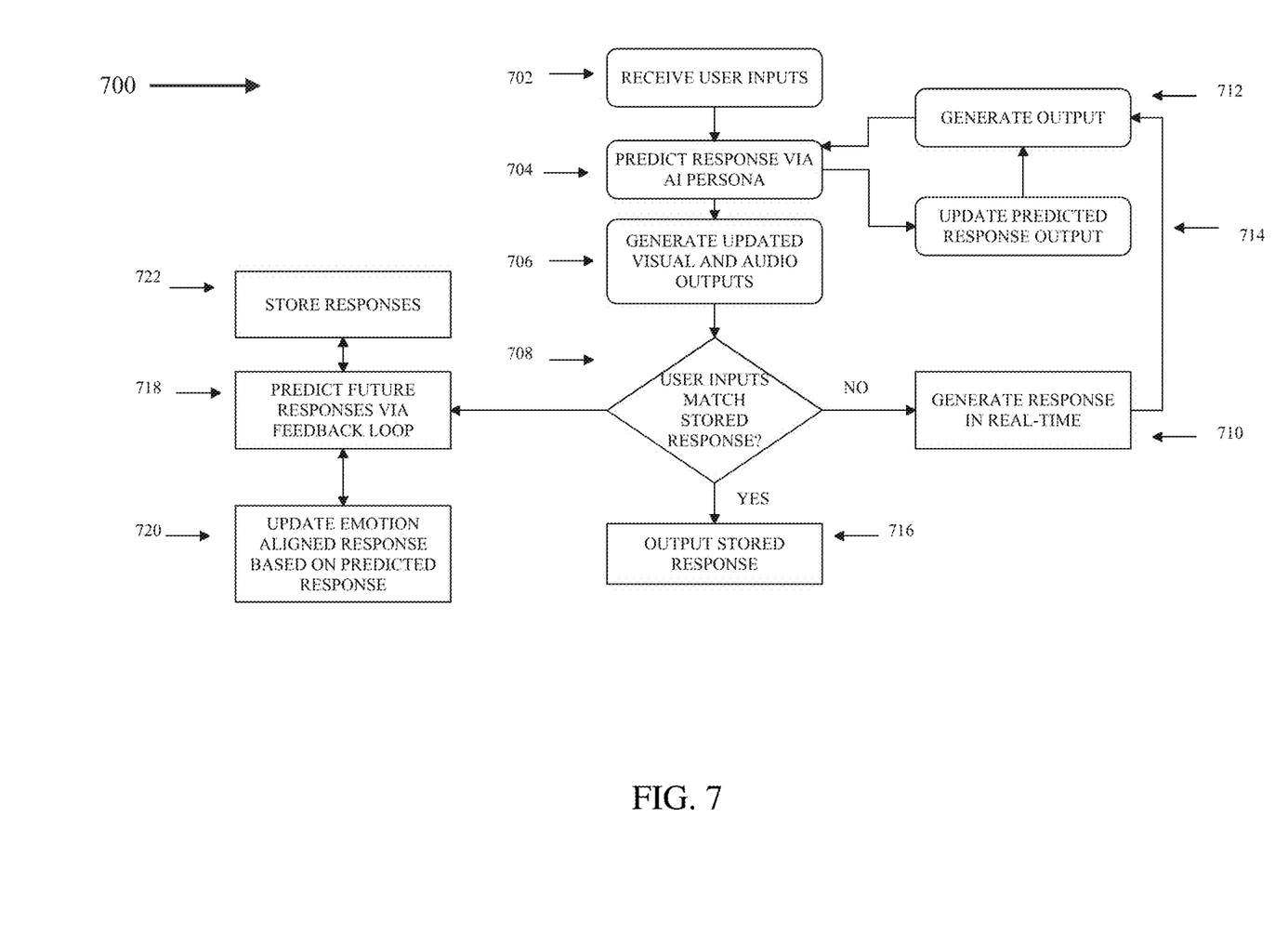
FIG. 7 is a flow diagram illustrating a method for generating responses of an AI persona based on matching a query and updating responses by learning facial expressions and emotions in accordance with some embodiments.

FIG. 7 is a flow diagram illustrating a method 700 for generating responses of an AI persona 102 based on matching a query and updating responses by learning facial expressions and emotions in accordance with some embodiments. The method 700 is described with respect to an example implementation of the AI system 100 of FIGS. 1-4. At block 702, the visual input device 160 detects a face input 103 in response to a trigger, such as movement detection within a predetermined distance and within a predetermined area. Alternatively, and/or in addition thereto, the visual input device 160 scans and detects the face input 103 in response to a command input received by the visual input device 160. Also, the audio input device 162 detects an audio input 104 in response to a trigger, such as movement detection within a predetermined distance and within a predetermined area. Alternatively, and/or in addition thereto, the audio input device 162 scans and detects the audio input 104 in response to a command input received by the audio input device 162.

At block 704, the text generator 408 receives and analyzes the text input 207 and a conversation history 401 (e.g., additional utterance and input or query from the user) to predict future queries and responses. The text generator 408 generates and predicts content for a plurality of predicted user queries 412, 413 and a plurality of predicted responses 414, 415 in parallel based on the text input 207 and the conversation history 401. At block 706, the AI persona 102 offers refinement of persona characteristics. The AI persona 102 will modify conversation features of the visual output 105 and the audio output 106 via a feedback loop in response to detected changes in context from the text input 207, the face input 103 and/or the audio input 104. At block 708, in response to receiving the text query, the AI persona 102 evaluates the text query using an IRC module. Specifically, the IRC module checks whether the text query has been input before, and therefore, is categorized as a preexisting query, or is instead anew query. At block 710, in response to the IRC detecting a new query, the TG module generates a new response in response to the IRC module confirming absence of the PQ within the embedded database. At block 712, the AI persona 102 presents at least one of the plurality of responses based on the new query, as well as additional context. At block 714, the AI persona 102 employs the CAE 214 to precompute queries and responses to quickly offer cached responses from further inputs and reduce latency. The CAE 214 stores the precomputed queries in the embedded database and the precomputed responses within the PR database. At block 716, for a preexisting query (PQ), the IRC module confirms presence of the PQ within an embedded database generated by the AI persona 102 and stored within the storage unit 140. A response lookup module retrieves a cached response from a preexisting response (PR) database generated by the AI persona 102 within the storage unit 140 for near-instantaneous delivery of a response.

At block 718, the AI persona 102 will modify conversation features of the visual output 105 and the audio output 106 via a feedback loop in response to detected changes in context from the text input 207, the face input 103 and/or the audio input 104. The feedback loop is real-time adaptation by the AI persona 102 to continuous input changes from the user and adjust the persona accordingly. At block 720, the modification of communication by the AI persona 102 may include extracting different predicted responses already stored in the storage unit 140 or generating a new response depending on the query input from the user. At block 722, the RVG 418 stores the precomputed responses within the PR database.

Figure 8:
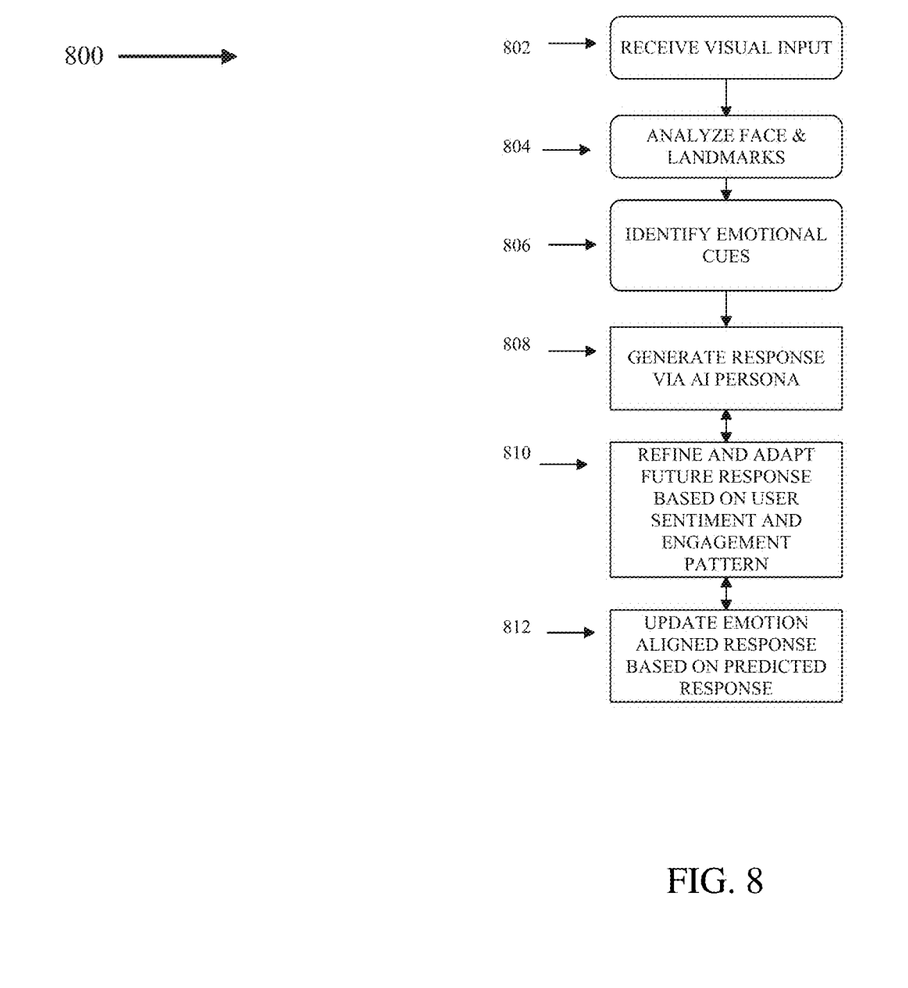
FIG. 8 is a flow diagram illustrating a method for generating an AI persona by analyzing facial expressions and identifying emotions in accordance with some embodiments.

FIG. 8 is a flow diagram illustrating a method 800 for generating an AI persona 102 by analyzing facial expressions and identifying emotions in accordance with some embodiments. The method 800 is described with respect to an example implementation of the AI system 100 of FIGS. 1-4. At block 802, the visual input device 160 detects a face input 103 in response to a trigger, such as movement detection within a predetermined distance and within a predetermined area. Alternatively, and/or in addition thereto, the visual input device 160 scans and detects the face input 103 in response to a command input received by the visual input device 160. After the visual input device 160 detects and scans the face input 103, the visual input device 160 sends the face input 103 to the memory 103 via the I/O controller 170 for processing by the one or more processing units.

At block 804, the CEAAG module 210 employs facial recognition models. The CEAAG module 210 extracts facial expressions, facial micro-expressions, and eye gaze patterns. Also, the CEAAG module 210 analyzes facial landmarks for positioning and orientation, such as eye location, nose location, ear location, mouth location, and the like. At block 806, the CEAAG module 210 retrieves context from the text query and detects emotional tone from the text input 207, the face input 103, and the audio input 104. The CEAAG module 210 examines spoken words, pitch, and tone from the audio input 104, as well as, facial movements and facial micro-expressions from the face input 103. At block 808, the AI persona 102 employs the EAAPG module 222 to generate an animated model and outputs a visual output 105. The EAAPG module 222 synchronizes facial expressions, lip movements, and micro-expressions. The EAAPG module 222 responds in real-time to exhibit a natural and human-like persona. At block 810, the AI persona 102 offers refinement of persona characteristics. The AI persona 102 will modify the visual output 105 and the audio output 106 as needed based on interaction with the user. At block 812, the modification of communication by the AI persona 102 may include extracting different predicted responses already stored in the storage unit 140 or generating a new response depending on the query input from the user.

As mentioned above, other embodiments and configurations may be devised without departing from the spirit of the invention and the scope of the appended claims.

The invention claimed is:

1. A method, comprising:
converting an audio input to a text input;
generating, by an artificial intelligence (AI) persona, at least one of a visual output and an audio output based on context of the text input and a face input;
extracting content representing emotions, the extracting including multimodal features comprising voice tone, pitch, speed, facial expression, gaze direction, and text sentiment, from at least one of the text input, the audio input, and the face input;
embedding the content into at least one context-aware vector representation by employing a deep learning model;
the vector being updated in a closed loop using prior outputs as additional input signals to encode an evolving emotional trajectory;
updating at least one of the visual output and the audio output based on prior outputs as additional input signals, wherein the updating includes reinforcement learning based on user feedback signals;
synchronizing, by the AI persona, at least one of the visual output and the audio output to movement of a rendered facial image;
modifying, by the AI persona, at least one of the visual output and the audio output during ongoing generation of at least one of the visual output and the audio output, including adjustment of appearance of the visual output and the audio output in response to real-time emotional changes in the text input, the audio input, and the face input.

2. The method of claim 1, wherein generating at least one of a visual output and an audio output comprises generating at least one of the visual output- and the audio output based on a predicted response cached by the AI persona.

3. The method of claim 2, wherein the predicted response of the AI persona uses at least one context-aware vector representation of at least one predicted query.

4. The method of claim 3, further comprising:
generating a plurality of responses corresponding to at least one predicted query, wherein each of the plurality of responses is unique and modifies at least one of the visual outputs and the audio output; and
modifying each of the plurality of responses based on the text input and the face input, and adjusting engagement style based on recurring sentiment trends and detected behavioral patterns.

5. The method of claim 1, wherein modifying at least one of the visual output and audio output comprises modifying at least one of the visual output and audio output wherein the reinforcement learning-based adaptation uses user feedback signals including explicit corrections, mid-output interruptions, and implicit affective cues to refine persona behavior across interactions.

6. The method of claim 5, wherein each of the plurality of multimodal inputs is at least one of voice tone, facial expression, and content of the text input, and the AI persona continuously updates its response model using reinforcement learning and past user interactions.

7. The method of claim 1, wherein the face input is at least one of a facial expression, a gaze, and facial micro-expressions for stress detection and engagement tracking.

8. The method of claim 1, wherein the audio input is at least one of tone, pitch, and speed.

9. An artificial intelligence (AI) persona system, comprising:
one or more processing units comprising a plurality of modules including an emotional fusion engine, an interruption and override detector, a reinforcement learning module, and a watermarking engine, the one or more processing units executing the plurality of modules that are configured to:
convert an audio input to a text input;
generate at least one of a visual output and an audio output based on context of the text input and a face input;
extract content representing emotions, the extracting including multimodal features comprising voice tone, pitch, speed, facial expression, gaze direction, and text sentiment, from at least one of the text input, the audio input, and the face input;
embed the content into at least one context-aware vector representation by employing a deep learning model, the vector being updated in a closed loop using prior outputs as additional input signals to encode an evolving emotional trajectory;
update at least one of the visual output and the audio output based on prior outputs as additional input signals, wherein the updating includes reinforcement learning based on user feedback signals;
synchronize at least one of the visual output and the audio output to movement of a rendered facial image; and
modify at least one of the visual output and the audio output during ongoing generation, including adjustment of appearance of the visual output and the audio output in response to real-time changes in the text input, the audio input, and the face input.

10. The AI persona system of claim 9, wherein the one or more processing units are configured to generate at least one of the visual output and the audio output based on a predicted response that is cached.

11. The AI persona system of claim 10, wherein the one or more processing units are configured to determine the predicted response using at least one context-aware vector representation of at least one predicted query.

12. The AI persona system of claim 11, wherein the one or more processing units are further configured to:
   generate a plurality of responses corresponding to at least one predicted query, wherein each of the plurality of responses is unique and modifies at least one of the visual output and the audio output; and
   modify each of the plurality of responses based on the text input and the face input and adjust engagement style based on recurring sentiment trends and detected behavioral patterns.

13. The AI persona system of claim 9, wherein the one or more processing units are configured to maintain an emotional context memory across user interactions and apply reinforcement learning-based adaptation to evolve engagement style, speech pacing, and facial animation parameters over time.

14. The AI persona system of claim 13, wherein each of the plurality of multimodal inputs is at least one of voice tone, facial expression, and content of the text input and the AI persona continuously updates its response model using reinforcement learning and past user interactions.

15. The AI persona system of claim 9, wherein the face input is at least one of a facial expression, a gaze, and facial micro-expressions for stress detection and engagement tracking.

16. The AI persona system of claim 9, wherein the audio input is at least one of tone, pitch, and speed.

17. A method, comprising:
   selecting, by an artificial intelligence (AI) persona, at least one of a visual output and an audio output in response to a plurality of inputs based on at least one predicted query;
   embedding extracted emotional content into at least one context-aware vector representation, the at least one context-aware vector derived from a plurality of multimodal inputs comprising tone, pitch, speed, facial expression, gaze direction, and text sentiment, the vector being updated in a closed loop using prior outputs as additional input signals to encode an evolving emotional trajectory;
   updating at least one of the visual output and the audio output based on prior outputs as additional input signals;
   modifying, by the AI persona, at least one of the visual output and the audio output during generation in response to changes in at least one of the plurality of multimodal inputs, and refining AI persona using reinforcement learning from recurring user interaction history; and
   updating, by the AI persona, a responses database in response to user interactions to ensure persona adaptation based on evolving user interactions, evolving preferences, and contextual learning.

18. The method of claim 17, wherein selecting at least one of the visual output and the audio output comprises:
   selecting precomputed responses in the responses database based on Boolean match of at least one predicted query and interaction history; and
   generating a new response in response to a failed match of at least one predicted query and updating the responses database with the new response.

19. The method of claim 17, wherein the plurality of inputs comprises:
   tracking, by the AI persona, a face of a user to detect expression;
   tracking, by the AI persona, gaze direction to detect eye focus; and
   transcribing, by the AI persona, audio input to text.

20. The method of claim 17, further comprising:
   generating, during generation of at least one of the visual output and the audio output, a watermark payload comprising data derived from the plurality of inputs;
   embedding the watermark payload into the visual output or audio output in real-time; and
   enabling verification of output integrity and traceability of the emotional context by comparing the embedded watermark payload to stored output data, including dynamic verification during ongoing generation.

* * * * *